May 11, 1954 N. B. COLEY ET AL 2,678,437

AIR TRAFFIC CONTROL SYSTEM

Filed April 27, 1949 2 Sheets-Sheet 1

INVENTORS
N. B. COLEY AND
BY R. F. ALBRIGHTON
Neil L. Preston,
Their ATTORNEY

AIR TRAFFIC CONTROL SYSTEM

Filed April 27, 1949 2 Sheets-Sheet 2

INVENTORS
N.B. COLEY AND
BY R.F. ALBRIGHTON
Neil D. Preston,
Their ATTORNEY

Patented May 11, 1954 2,678,437

UNITED STATES PATENT OFFICE 2,678,437

AIR TRAFFIC CONTROL SYSTEM

Nelson B. Coley and Reginald F. Albrighton, Rochester, N. Y., assignors to General Railway Signal Company, Rochester, N. Y.

Application April 27, 1949, Serial No. 89,824

7 Claims. (Cl. 343—6)

Figure 1:
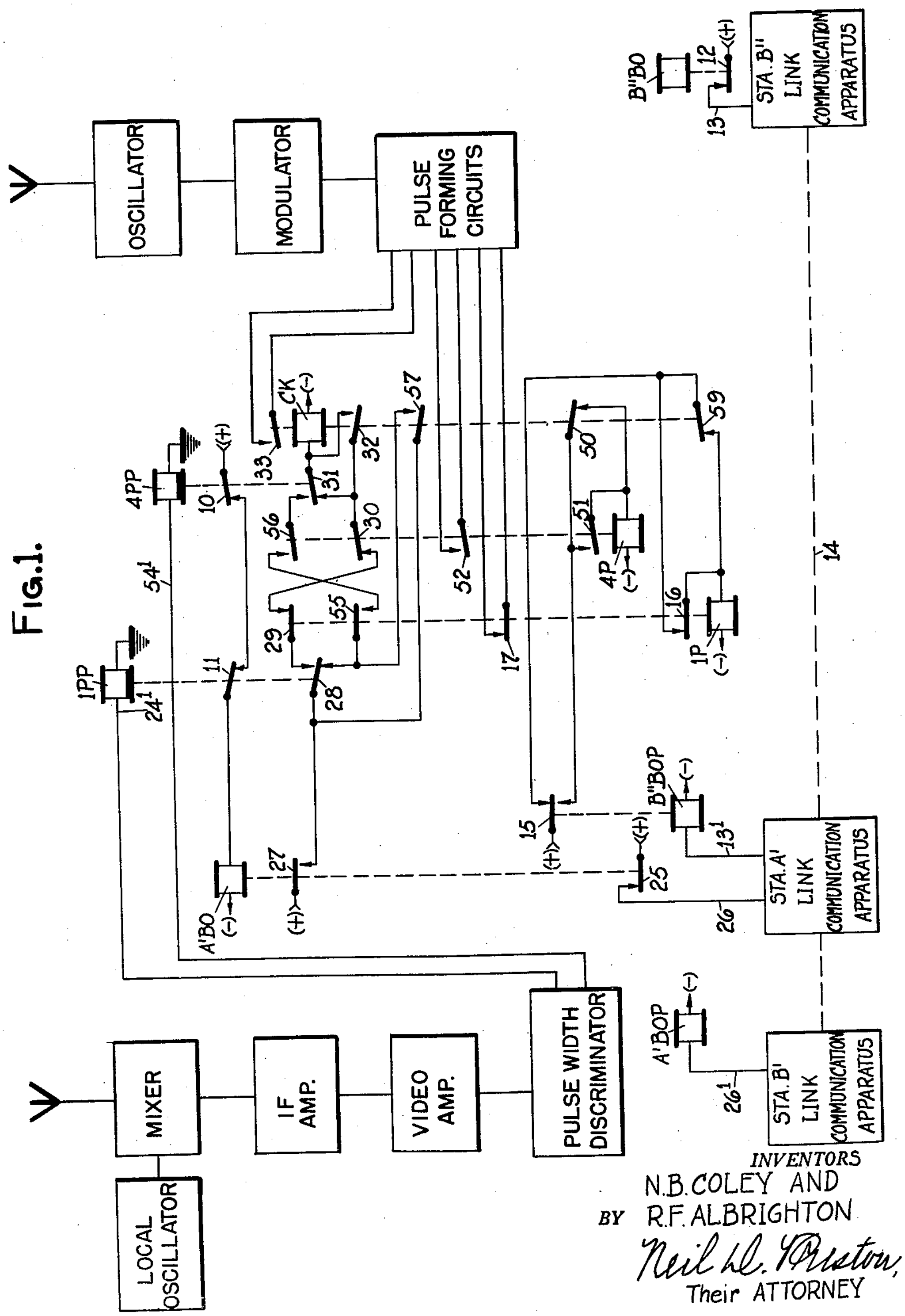

This invention relates to air traffic control systems, and it more particularly relates to such systems of the block signalling type for governing airplane traffic.

A block signalling system of this general character is disclosed in the prior application of H. C. Kendall et al. Ser. No. 743,046, filed April 22, 1947, now Patent No. 2,588,930, which corresponds to the Belgium Patent No. 473,596, dated June 30, 1947. According to that application, the airway is divided into blocks, each of which has a ground station transmitter at the center thereof, and the respective block stations transmit pulses in synchronism continuously for scanning respective flight altitudes. The airplanes flying the airway are equipped with radio receiving apparatus which is tuned to the frequency of transmission from the block stations together with a transponder that responds by radio transmission to the pulses that are transmitted from the nearest ground station for the particular flight altitude of the airplane so as to register the presence of that airplane as being within the block and at its particular flight altitude. When a ground station receives a control transmitted from an airplane registering occupancy within its block for a particular flight altitude, a clear or a hold indication control is transmitted to the airplane by pulse width modulation selected in accordance with whether or not the next block in advance for the direction of flight is or is not occupied for the corresponding flight altitude. Upon this control being received by equipment on the airplane, a control relay is selected for energization in accordance with the control that is received, and the transponder transmits an indication to the block station as to the particular control that has been received. The block station in turn checks the indication which has been received with the control it has transmitted to the airplane, and if these are in correspondence, a check control is transmitted to the airplane which permits the energization of a red of a green signal lamp on the airplane in accordance with the particular hold or clear control that has been communicated. These respective control, indication, and check controls are communicated continuously and the signal lamp on the airplane that has been selected for energization is energized dependent upon the maintenance of continuous communication with the block station of these controls and indications.

Because of the distinctive controls being communicated by pulse width modulation, it will be readily apparent that certain types of interference and/or echo stretching can momentarily alter the code being communicated so as to cause a loss of correspondence of the indication transmitted by the airplane transponder and the control transmitted by the block station, thus providing a momentary deenergization of the signal or a momentary flash of the other aspect of the signal.

An object of the present invention is to prevent a momentary deenergization or a momentary flash of an airplane signal under the above described conditions. This is accomplished by providing circuit means partly on the airplane and partly at the block stations for preventing the momentary response on the airplane of a signal control relay under conditions where the transmission of a different checked signal control is maintained transmitted at reasonably frequent intervals. In attaining this object of the present invention an airplane carried signal control relay when once picked up in response to a particular signal control is maintained picked up by a stick circuit when the control has been checked through communication with a block station, and at the time of the establishment of this stick circuit, the pick-up circuit of the control relay for the other aspect of the signal is opened so as to prevent its energization in response to a control so long as a control is intermittently received to maintain the control relay for the checked control steadily picked up by energization of its stick circuit.

Another object of the present invention is to apply a similar stick circuit control expedient to the control circuit of check relays at each of the block stations to prevent the momentary loss of energization of these relays in case of a momentary loss of correspondence of the indications received from airplanes with the controls that are transmitted for the airplane because of another control indication relay being momentarily energized by an extraneous source of energy.

Other objects, purposes, and characteristic features of the present invention will be in part obvious from the accompanying drawings, and in part pointed out as the description progresses.

Figure 2:
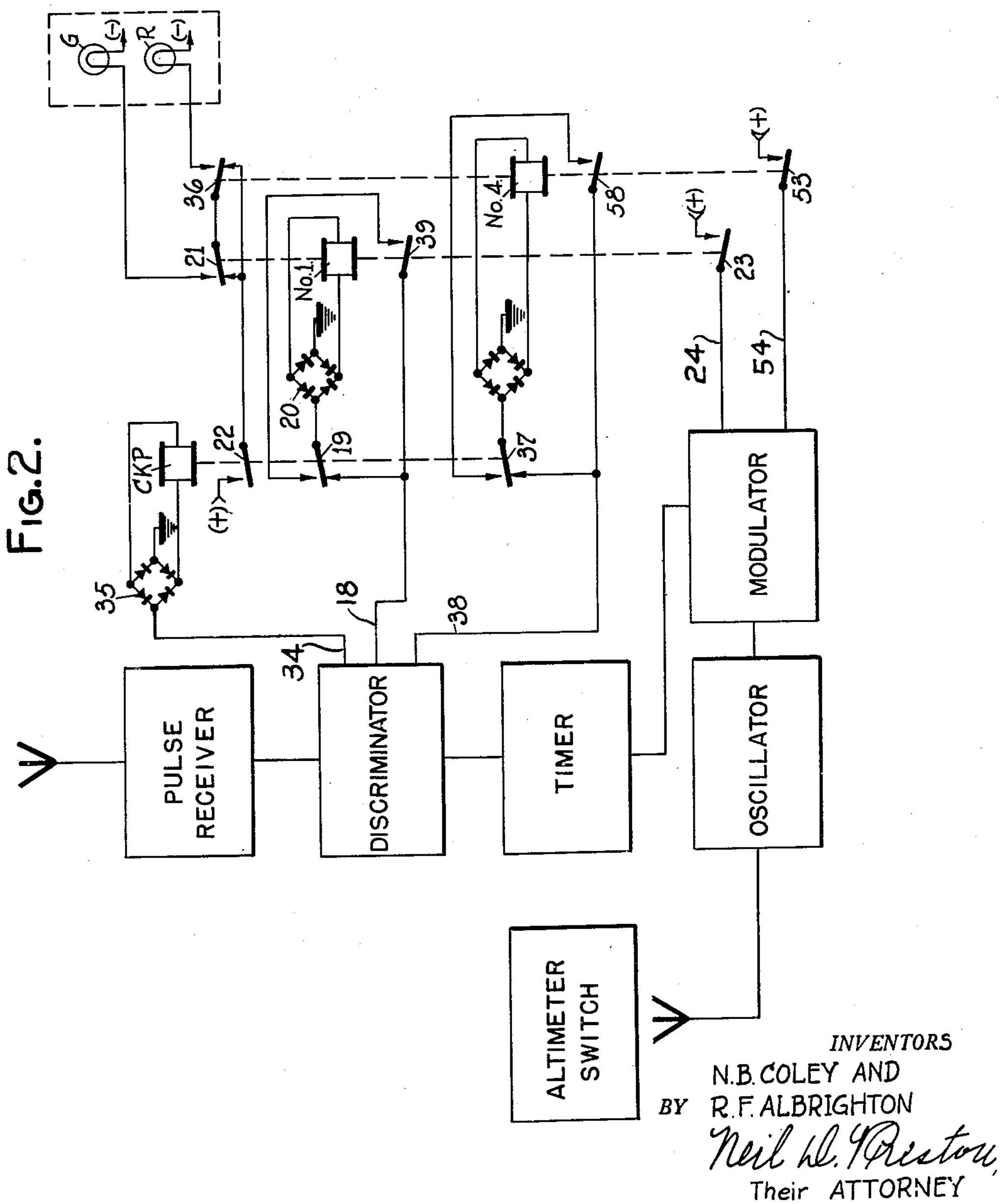

In describing the invention in detail, reference is made to the accompanying drawings in which:

Fig. 1 illustrates schematically and partly by block diagram ground located control and communication apparatus; and, Fig. 2 illustrates schematically and partly by block diagram control and communication apparatus for installation on an airplane to provide signal indications in accordance with controls communicated from the respective block stations as the airplane progresses along an airway.

Although the present invention is illustrated as being applied to a block signalling system such as is disclosed in the above mentioned prior application of H. C. Kendall et al., it is to be understood that the present invention is not limited to use with this system and that other means of block demarcation and/or means of communication between the airplanes and the ground stations may be employed in accordance with the requirements of practice.

The present invention is more particularly involved in the circuit selections provided to select controls for transmission from the block stations and in the control of the signals on the airplanes in accordance with controls communicated from the block stations, and therefore it is believed that it is unnecessary to consider specific details relative to the apparatus involved in block demarcation and communication between the block stations and respective airplanes as reference can be made to the above mentioned application for a more complete disclosure of this organization. It is contemplated that as a part of the system, communication is to be maintained between respective block stations which may be in any suitable manner, such as by direct wire control, coded line circuit communication, or radio link communication in a system such as is disclosed, for example, in the prior application of N. B. Coley Ser. No. 745,673, filed May 2, 1947, which has resulted in Patent No. 2,487,102, dated November 8, 1949.

With reference to Fig. 1, a link communication system has been illustrated partly by block diagram wherein the station A′ is the station that is more particularly considered for this embodiment of the present invention, there being provided an adjoining station B′ to the rear (for the particular direction of traffic assumed), and a station B″ as the next station in advance. These stations are illustrated as being interconnected by normally active radio link communication apparatus which is considered as being normally active to transmit conditions as to block occupancy of respective flight altitudes to the respective stations in the rear so that such stations may govern the signal controls transmitted to any airplane that may be within the associated blocks and at the same flight altitudes in accordance with the occupancy of the next block in advance. It is therefore provided that a normally energized block occupancy relay B″BO is provided for each flight altitude at station B″ to be dropped away by the occupancy of that block at that flight altitude in a manner which will be considered with respect to the dropping away of a similar relay BO at the station A′. A relay B″BOP is provided at station A′ for each flight altitude, such relay being controlled by continuous communication with station B″ as if it were a direct wire repeater relay of the relay B″BO for the corresponding flight altitude at station B″.

The apparatus illustrated in Fig. 1 as being provided at station A′ for the communication of controls with the respective airplanes in the corresponding block is to be considered typical of the apparatus provided at each of the other block stations that may be included in the system. The circuit organization illustrated in Fig. 1 is also to be considered as typical of the circuit organization that is provided for each of the respective flight altitudes for which the system is to be used.

The ground station A′ is illustrated as having a suitable transmitter for transmitting controls by code to the respective airplanes in the associated block, and apparatus is illustrated in block form as being provided for receiving indications transmitted from the respective airplanes within the block with which the station A′ is associated. This apparatus includes suitable gating means opened for a short length of time following each control pulse transmitted so as to receive a reply pulse from an airplane at that flight altitude.

Relays 1P and 4P are provided at the typical station A′ for each flight altitude for selecting a clear or a hold control for transmission to an airplane for the particular block and flight altitude with which those relays are associated.

The relays 1PP and 4PP are provided at station A′ for each flight altitude as relays to be conditioned in accordance with indications received from airplanes at the associated flight altitudes within the block as a means for checking the controls as they are communicated to the airplanes.

A check relay CK is provided for each flight altitude at the typical station A′ for checking that the indications received by the relays 1PP and 4PP are in correspondence with respective controls that are selected for transmission by the relays 1P and 4P for that flight altitude. The check relay CK at station A′ for a particular flight altitude when picked up is effective to select a distinctive check control for transmission to an airplane at that flight altitude as a means to permit the display of a signal aspect in the airplane. Thus, the energization of the signal on the airplane is in accordance with the control for governing that aspect having been checked as being received on the airplane corresponding with the control selected for transmission at the ground station.

With reference to Fig. 2, airplane carried equipment is illustrated comprising an altimeter switch together with a radio receiver and discriminator organization adapted to be distinctively responsive to the respective controls that are transmitted from the nearest block station along the airway.

Relays No. 1 and No. 4 and CKP (see Fig. 2) are provided on the airplane as being distinctively conditioned by the output of respective discriminators in accordance with controls that are communicated by radio from the block station for the block within which the airplane is flying. A signal of a suitable character is provided on each airplane having means for displaying respective clear and hold indications as selected by the No. 1 and No. 4 relays. This signal is illustrated as having a green lamp G for a clear indication and a red lamp R for a hold indication.

The airplane carried equipment also comprises a transponder or other suitable transmitting apparatus whereby indications are transmitted to the ground station for the block within which the airplane is flying as to the condition of energization of the relays Nos. 1 and 4, such transponder being effective to transmit a pulse in reply to each control pulse that is received on the airplane.

Having thus considered the general organization of the apparatus for the particular embodiment of the present invention that has been illustrated, further consideration of the organization will now be considered together with the mode of operation under various typical conditions of operation.

Considering first the operating conditions with no airplanes present along the airway, according to the system as described in the above mentioned Kendall et al. applicaton, respective altitude scanning cycles are transmitted simultaneously from all block stations, each cycle comprising a synchronizing pulse followed by control pulses for the respective flight altitudes, one pulse being provided for each flight altitude. The control pulse is characterized by pulse width modulation in accordance with the particular control that is to be transmitted from that block station.

Although the controls required for communication according to this embodiment of the present invention are few in number, only hold, clear and check controls being required to be transmitted, there are actually many other controls some of which have been shown in the above mentioned Kendall et al. application that may be required to be transmitted in practice. Thus, according to the Kendall et al. application, provision is made for the communication of a large number of controls by the counting of the scanning cycles in sequences of four altitude scanning cycles each, each sequence constituting what may be considered as a complete information, or sequence cycle. The pulses that are transmitted for control purposes for each flight altitude during a sequence cycle are characterized by their distinctive pulse widths in accordance with the first, second, third or fourth scanning cycle within that sequence during which such pulses are transmitted. In other words, generally speaking, there are four different width pulses that may be transmitted during a sequence cycle, one for each scanning cycle of the sequence. In addition a still different pulse width is assigned to the transmission of a check control in either the first or fourth cycles of a sequence, whichever one is not being used for transmission of another control. Thus, according to the Kendall et al. application, a clear control is provided by the distinctive width control pulse transmitted during No. 1 scanning cycle of the sequence, and a hold control is transmitted by the distinctive width control pulse transmitted during the No. 4 scanning cycle of the sequence.

Inasmuch as clear and hold controls are never required to be simultaneously communicated, there is a blank pulse transmitted of a distinctive pule width for the scanning cycle in the sequence during which there is no control to be transmitted until such time as when a check control is called for to be communicated, and under these conditions, a check pulse is substituted for the blank pulse that has been transmitted, a check pulse being also of a distinctive pulse width.

According to the Kendall et al. application, the scanning cycles No. 2 and 3 of each information cycle sequence are provided for the communication of ascent and descent controls, and such other controls as may be required to be communicated, these controls being communicated in a manner comparable in general to that which has been pointed out as being employed for the communication of controls during the respective Nos. 1 and 4 scanning cycles of the sequence. As a matter of readily identifying relays used in the circuits shown in Figs. 1 and 2 of the present application with the respective sequences of a sequence cycle, numerical prefixes have been employed in the reference characters which are particularly indicative of the respective scanning cycles of a sequence during which controls for those particular relays are transmitted.

The altitude scanning cycles are transmitted at a relative rapid rate so that 15 pulses per second are transmitted for each flight altitude as a means for maintaining substantial constant control from the ground stations of apparatus in airplanes at respective flight altitudes within the blocks for which such ground stations are provided, the relays which are responsive to controls communicated being sufficiently slow acting to be maintained steadily picked up as long as pulses for their control are intermittently received at their rate of transmission.

In accordance with the airways being assumed to be unoccupied by airplanes under the conditions which have been defined as being the normal conditions of the system, a block occupancy relay BO is normally energized at each block station corresponding to the relay A'BO at station A'. The relay A'BO is energized through back contacts 10 and 11 respectively of relays 4PP and 1PP for the typical flight altitude with which the relay A'BO is associated. Thus in a similar manner the relay B''BO at station B'' is maintained picked up in accordance with there being no airplane in its associated altitude within the block B'', and the closure of its front contact 12 provides that the repeater relay B''BOP at station A' is maintained steadily energized. It is to be understood that the application of energy through front contact 12 of relay B''BO to wire 13 maintains energy through suitable link communication as indicated by the dotted line 14 applied to the wire $13^1$ just as if the relay B''BOP at station A' were connected by direct wire control through front contact 12 of relay B''BO at station B''.

In accordance with the front contact 15 of relay B''BOP being maintained closed under normal conditions, the relay 1P is maintained energized by a stick circuit extending from (+), including front contact 15 of relay B''BOP, front contact 16 of relay 1P and winding of relay 1P, to (—). Because of relay 1P being picked up, the closure of its front contact 17 selects that the ground station A' transmits a pulse width on a frequency for airplane reception during the first scanning cycle of each complete information sequence cycle for the typical flight altitude illustrated as a control pulse indicative of the next block in advance being unoccupied for that particular flight altitude.

Having considered the conditions at the respective ground stations with no airplanes present, it will be assumed that an airplane carrying equipment as illustrated in Fig. 2 enters the block A' at the flight altitude for which the relay control apparatus illustrated in Fig. 1 is provided. Upon entry of the block the airplane receiver receives the distinctively characterized clear control that is communicated from the ground station in accordance with the closure of front contact 17 of relay 1P (see Fig. 1). This control is selected on the airplane as distinguished from pulses for other flight altitudes by the altimeter switch in combination with suitable electronic gating, the control pulses for other flight altitudes being blocked out so that the control relays on the airplane are responsive only to pulses transmitted for the particular flight altitude of that airplane.

Thus in accordance with the reception of the pulse width characterizing a clear control, there is an output of the clear control discriminator applied to the wire 18, and such output is fed through back contact 19 of relay CKP and a suitable full wave rectifier 20 to the winding of the clear control relay No. 1.

The picking up of relay No. 1 under these conditions cannot energize the green lamp G of the signal in accordance with the closure of its front contact 21 because the check relay CKP holds the signal energization circuit open at front contact 22. The relay No. 1 in picking up, however, applies energy to the transponder through front contact 23 and wire 24 to effect the transmission from the airplane of a reply pulse in response to each pulse that is received on the airplane, such reply pulse being distinctively characterized by pulse width modulation as a means for indicating at the ground station of the block which has been entered that the clear signal control has been received by the airplane and also as a means for registering the occupancy of that block at the ground station.

Thus with reference to Fig. 1, the receiver at ground station A' is responsive to the reply pulses transmitted from the airplane. The block station receiver therefore has energy applied as an output of one of its discriminators to the wire $24^1$ which is connected through the winding of the relay 1PP to ground. Relay 1PP is therefore steadily picked up as if wire $24^1$ of Fig. 1 were directly connected to wire 24 of Fig. 2. The rapid rate of reception of the indication pulses from the airplane thus maintains the relay 1PP steadily picked up at the ground station, and this relay in its picked up position registers occupancy by opening back contact 11 in the circuit for the block occupancy relay A'BO so as to cause that relay to be dropped away. In the dropping away of the relay A'BO, the front contact 25 is opened and thus energy is removed from the wire 26 which causes the release of the block occupancy repeater relay A'BOP at the next block station in the rear. This relay A'BOP is dropped away through the link communication system as if the wire 26 at station A' were connected directly to the wire $26^1$ of the relay A'BOP.

In accordance with a block clear indication control being transmitted to the airplane, and the airplane transmitting an indication to register its occupancy of the block and indicate that the clear control is being received, the check relay CK at the block station A' is picked up to transmit a check control to the airplane for permitting the energization of the green lamp G (see Fig. 2) of the airplane signal. The relay CK is energized under these conditions by a circuit extending from (+), including back contact 27 of relay A'BO, front contact 28 of relay 1PP, front contact 29 of relay 1P, back contact 30 of relay 4P, back contact 31 of relay 4PP, and winding of relay CK, to (−).

Upon the picking up of the relay CK under these conditions, the closure of its front contact 32 establishes a stick circuit shunting back contact 31 of relay 4PP out of the circuit that has just been described as a means for preventing the momentary release of the relay CK if for some reason the relay 4PP should become momentarily picked up under the assumed conditions as by the reception of a pulse of a width for picking up relay 4PP created by combination with radiated energy from an extraneous source or by echo stretching and the like.

When relay CK is picked up under the conditions that have been described, the closure of its front contact 33 selects a code character for transmission to the airplane of a pulse width for picking up the relay CKP (see Fig. 2) on the airplane. It will be noted that this control is communicated contemporaneously with the clear block control that is transmitted in accordance with the closure of front contact 17. This transmission of these two controls at the same time is provided as fully disclosed in the above mentioned Kendall et al. application by transmitting the block clear control as selected by front contact 17 during the first of the four altitude scanning cycles of each sequence cycle. The check control as selected by the contact 33 is transmitted during the fourth of these scanning cycles of each sequence cycle, and it is distinctively characterized by pulse width to distinguish from the hold control that is assigned to this particular scanning cycle but is not being transmitted at this time. In other words, as has been heretofore pointed out, hold and clear controls are never transmitted at the same time from the same block station for any particular flight altitude, and the scanning cycle of each sequence that is assigned for the transmission of hold or clear controls that is not in use for one of these purposes is employed for the transmission of the check control which is distinctively characterized by pulse width.

The reception on the airplane of the check control provides an output for the particular discriminator which passes the pulse width characterizing that control, and thus the output of this discriminator is applied to the wire 34 which feeds the full wave rectifier unit 35, the output of which provides for the pick-up of the relay CKP. The relay CKP on the airplane is maintained steadily picked up by the check pulses which are received and thus by the closure of its front contact 22, the green lamp G of the signal is energized by a circuit extending from (+), including front contact 22 of relay CKP, back contact 36 of relay No. 4, front contact 21 of relay No. 1, and lamp G of the signal, to (−).

The picking up of relay CKP opens the pick-up circuits for both control relays No. 1 and No. 3 at front contacts 19 and 37 respectively and thus prevents the picking up of the No. 4 relay if energy is momentarily applied to the control wire 38 in accordance with the reception of a pulse which has been modified so as to be passed through the discriminator whose output feeds the wire 38. The relay No. 1 is maintained picked up, even though its pick-up circuit has been opened at back contact 19 of relay CKP, by a stick circuit which connects the wire 18 through front contact 39 of relay No. 1, front contact 19 of relay CKP, rectifier 20, and winding of relay No. 1, to ground.

It is therefore provided that as long as clear and check control pulses are received on the airplane for the flight altitude at which the airplane is flying at reasonably frequent intervals, the signal steadily maintains its green aspect, irrespective of the possible momentary energization of the output wire 38 of the discriminator associated with the control of relay No. 4 because the relay No. 4 has its pick-up circuit open at back contact 37 of relay CKP and thus interference with the steady energization of the green lamp G of the signal is prevented.

Having thus considered the conditions involved in providing a clear indication by the signal on the airplane, it will now be assumed that the airplane upon entering block A' receives a hold indication because of the next block in advance being occupied by an airplane at that particular flight altitude. Under these conditions, the relay B''BO at the next station in advance is dropped away to open its front contact 12 because of that block being occupied for the flight altitude under consideration, and therefore the repeater relay B''BOP at station A' is dropped away, and the dropping away of that relay is effective by the closure of back contact 15 to select the energization of the pulse determining relay 4P rather than the relay 1P, as has been described when considering the transmission of a clear control. The relay 4P is picked up under these conditions by a circuit extending from (+), including back contact 15 of relay B''BOP, back contact 50 of relay CK, and winding of relay 4P, to (—). The closure of front contact 51 upon the picking up of that relay establishes a stick circuit to shunt contact 50 out of the circuit just described so that the relay 4P is maintained steadily picked up subsequent to the picking up of the relay CK when the control has been checked.

In accordance with the picking up of relay 4P, a pulse width characterized by the picking up of that relay is transmitted upon the closure of front contact 52 during the fourth altitude scanning cycle of each sequence cycle that is communicated to the airplane.

With reference to Fig. 2 the reception of the hold control pulses on the airplane is effective through the airplane receiver and a discriminator to apply energy to the wire 38 and thus to energize the relay No. 4 through back contact 37 of the check relay CKP. The relay No. 4 in picking up, by the closure of its front contact 53, applies energy to the transpounder by wire 54 so as to characterize a reply pulse for transmission in response to each pulse that is received from the ground station in a manner to provide for the application of energy to the wire 54[1] (see Fig. 1) as an output circuit of the receiver at station A' so as to energize the relay 4PP. This relay when energized opens its back contact 10 and thus deenergizes the block occupancy relay A'BO so as to transmit to the rear through the link communication system a control indicative of the presence of the airplane in the block associated with station A' in a manner comparable to that which has been described.

When relay 4PP is picked up under these conditions, and the relay A'BO is dropped away, a circuit is conditioned for the check relay CK extending from (+), including back contact 27 of relay A'BO, back contact 28 of relay 1PP, back contact 55 of relay 1P, front contact 56 of relay 4P, front contact 31 of relay 4PP, and winding of relay CK, to (—). Upon the picking up of relay CK, the closure of its front contact 57 establishes a stick circuit to shunt the back contact 28 out of the circuit just described so that the momentary energization of the relay 1PP which is supposed to be deenergized at this time cannot momentarily cause the release of the check relay CK and thus interrupt the continuity of the aspect displayed by the signal on the airplane.

The relay CK when picked up effects the transmission of a pulse during each sequence cycle of a distinctive pulse width in accordance with the closure of its front contact 33, this pulse being transmitted during the No. 1 altitude scanning cycle of the sequence of four cycles used for the transmission of complete information to the airplane as there is no signal clear control transmitted at this time.

The reseption on the airplane of the check pulses applies energy through the receiver and a suitable discriminator to the wire 34 (see Fig. 2) for energization of the relay CKP through the rectifier 35. Relay CKP when picked up under these conditions, assuming the relay No. 4 to have been previously picked up in a manner which has been described, provides for the energization of the red lamp R of the signal through front contact 22 of relay CKP, back contact 21 of relay No. 1, and front contact 36 of relay No. 4.

Upon the picking up of the check relay CKP, the pick-up circuits for the relays No. 1 and No. 4 are opened in a manner comparable to that which has been described at back contacts 19 and 37, and the relay No. 4 is maintained picked up by the back contact 37 being shunted by the stick contact 58 through front contact 37 of relay CKP. Thus this relay is maintained picked up in accordance with the continued reception of pulses of a width characterized as a hold control through front contact 37 of the check relay CKP so that its deenergization can be effected either by the release of the check relay CKP, or by the failure to receive pulses as applied by the output circuit of a suitable discriminator to the wire 38.

After having considered conditions whereby either a hold or a clear control is displayed by the signal on an airplane when it enters a block as selected by the condition of occupancy of the next block in advance, the mode of operation will now be considered wherein a change in the indication of a signal is effected while an airplane is within a particular block. There are of course several traffic conditions that may be set up to establish such a change, and for considering a typical condition, it will be assumed that the block in advance associated with station B'' has been occupied by an airplane when a following airplane has entered the block governed by station A' so that the red lamp R of the signal in the airplane is energized in a manner which has been described as a hold indication. It will now be assumed that the airplane in the block governed by station B'' has proceeded to a point to where it has left that block so as to permit the relay B''BO (see Fig. 1) to be picked up to indicate that this block is unoccupied. In accordance therewith, the relay B''BOP at station A' is restored to its normal picked up position, and the shifting of its contact 15 opens the circuit for the relay 4P which has been energized and conditions a pick-up circuit for the relay 1P.

Upon the dropping away of relay 4P, the opening of front contact 56 in the circuit for the check relay CK causes the dropping away of that relay, and the relay CK when dropped away closes a pick-up circuit for relay 1P through back contact 59. Thus in response to the change in the condition of occupancy in the next block in advance, the hold control that has been transmitted is terminated by the opening of front contact 52 of relay 4P; the check control which has been transmitted is interrupted by the opening of front contact 33; and the closure of front contact 17 of relay 1P renders the transmission of a clear control effective by transmitting a distinctive pulse width during the first scanning cycle of each sequence cycle that is transmitted from station A'.

Considering the apparatus on the airplane, the termination of the check and hold control transmissions has been effective to deenergize the wires 34 and 38 and to thus cause the relays CKP and No. 4 to be dropped away. The wire 18, however, becomes energized in accordance with the clear control that is being transmitted and the relay No. 1 is picked up by the energization of a circuit closed through back contact 19 of the relay CKP. This relay No. 1 when picked up closes front contact 23 to apply energy to wire 24 so as to cause the transmission by the transponder of a pulse width characteristic of the clear control that has been received. The reception of this control at the ground station A' picks up the relay 1PP and thus opens the circuit for the block occupancy relay A'BO at back contact 11 and establishes a circuit which has been described to effect the picking up of the check relay CK. The relays 1PP and 4PP are made sufficiently slow in dropping away to prevent the momentary energization of relay A'BO under conditions of shifting from the energization of one relay to the energization of the other. This check relay CK when picked up closes its front contact 33 to effect transmission of a pulse width characterizing a check control so that energy is applied to wire 34 (see Fig. 2) for the energization of the check relay CKP. When the check relay CKP is energized under these conditions, the closure of its front contact 22 energizes the circuit for the green lamp G of the signal to set up a clear indication in accordance with the next block in advance having become unoccupied for the particular flight altitude under consideration, the red lamp R of the signal having been deenergized upon the deenergization of relay No. 4.

It will be readily apparent that a similar mode of operation is effected under conditions where the signal indication for the signal of an airplane within a block is changed from green to red in accordance with the block in advance becoming occupied.

It will thus be seen that although the respective airplane signal control relays are maintained picked up by their stick circuits, and the pick-up circuits are opened by the check relay CKR, there is no delay in changing the signal indications because the changes are initiated by the ground stations as has been described whereby the check relay CK at the ground station is immediately dropped away so as to interrupt the transmission of the check control at the time when a different control relay P is picked up for selecting a different control pulse width for transmission to the airplane.

Although only controls for red and green signal aspects under normal flying conditions at assigned flight altitudes have been considered, it is to be understood that the system may be modified to include other traffic control means such, for example, as has been provided in the system according to the above mentioned Kendall et al. application. Thus such controls as ascent, descent, double occupancy, and look-in controls may be added in accordance with the requirements of practice. It is also to be understood that the stick circuit principle of energization that has been described for the signal control relays No. 1 and No. 4 can similarly be applied to other control relays as required.

Having described one particular air traffic signal control system as one embodiment of the present invention, it is desired to be understood that this form has been selected for the purpose of facilitating the disclosure of the present invention, rather than to limit the number of forms that the invention may assume, and it is to further understood that various adaptations, alterations, and modifications may be applied to the specific form shown to meet the requirements of practice without in any manner departing from the spirit or scope of the present invention except as limited by the appended claims.

What we claim is:

1. In a block signalling system for governing the aspects of a signal on an airplane from a block station, an airplane carried multiple aspect signal, two-way pulse communication means for transmitting indications from the airplane to the block station and distinctive controls for respective aspects of said signal from the block station to the airplane, electro-responsive means on the airplane distinctively conditioned in accordance with the distinctive controls received from the block station, said electro-responsive means being effective to select the aspect to be displayed by said signal in accordance with the signal control being received and being effective to govern the character of reply pulses transmitted from the airplane to the block station as indications of the respective controls that have been received on the airplane, and a check relay on the airplane rendered active by a distinctive control communicated from the block station, said check relay being effective when rendered active to cause said signal to display an aspect as selected by said electro-responsive means, and said check relay when active being effective to prevent further response of said electro-responsive means to any other controls received on the airplane to change the aspect of said signal.

2. In a block signalling system, two-way radio communication apparatus partly at a ground located block station and partly on an airplane for transmitting selected controls from the block station to the airplane and indications from the airplane to the block station, electro-responsive means on the airplane distinctively responsive to respective controls received, said electro-responsive means being effective to cause transmission to the block station of indications characterized in accordance with controls that are received, said communication apparatus being effective to transmit from the block station a distinctive check control provided that an indication received from an airplane checks in correspondence with a control transmitted to the airplane, a check relay on the airplane energized in response to said distinctive check control transmitted from the block station, said check relay when energized being effective to prevent further actuation of said electro-responsive means in response to other controls that may be received on the airplane.

3. A block signalling system for governing a signal on an airplane from a ground located block station comprising in combination, an airplane carried multiple aspect signal, signal control means on the airplane for selectively governing said signal aspects displayed by the signal in accordance with the character of signal control received from the block station, a two-way pulse communication system for communicating controls from the block station to the airplane and indications from the airplane to the block station, and checking means partly at the block station and partly on the airplane including said pulse communication system rendered active to permit the display of a particular aspect by said signal only provided that an indication is received at the block station that the signal control received on the airplane corresponds with the control transmitted from the block station, said checking means when active being effective to prevent a change of aspect of said signal in case there is momentary reception on the airplane of a control for a different signal aspect.

4. A block signalling system for governing a signal on an airplane from a ground located block station comprising in combination, a two-way radio communication system effective to maintain substantially constant pulse communication of selected controls between the block station and the airplane, control selecting means at the block station for selecting one of a plurality of distinctive signal controls for transmission to the airplane, said means also being effective to at times select a check control for transmission to the airplane, a signal control relay on the airplane for each signal control to be communicated from the block station, a check control relay on the airplane for energization in response to the transmission of a check control from the block station, pick-up circuit means for energizing each of said signal control relays in response to the communication of the corresponding control from the block station, said means being effective only provided that said check relay is deenergized, and stick circuit means for maintaining each of said signal control relays on the airplane energized, said stick means being effective only provided that said check relay is energized in response to a check control communicated from the block station.

5. A multiple aspect block signalling system for governing a multiple aspect signal on an airplane from a ground located block station comprising in combination, an indication relay at the block station for each aspect of said signal, a signal relay on the airplane for each aspect of said signal, a check relay on the airplane, two-way radio pulse communication means effective to maintain constant communication of selected controls from the block station to the airplane and of selected indications from the airplane to the block station, said pulse communication means being effective to communicate signal controls from the block station to the airplane and selectively energize said signal control relay on the airplane corresponding to the control communicated, said pulse communication means being effective to transmit an indication in reply to each signal control received and thereby selectively energize said indication relay at the block station corresponding to the signal control that has been received on the airplane, and said pulse communication means being effective to transmit a check control from the block station provided that the indication received from the airplane is in correspondence with the signal control that is being transmitted and thereby energize said check relay on the airplane, and stick circuit means rendered effective in response to the energization of said check relay on the airplane for maintaining said signal control relay energized dependent upon the continued reception of the corresponding signal control from the block station, and means effective upon the picking up of said check relay for preventing the actuation of any signal control relay in response to pulses received when said check relay is energized.

6. In a block signalling system for an airway wherein the airway is divided into blocks and each block has a block station; radio pulse transmitting and receiving apparatus at each of the block stations normally active to transmit a control characteristic of the condition of occupancy of each flight altitude within the block in advance for a given direction of traffic; airplane carried apparatus for each airplane flying the airway comprising in combination, radio pulse transmitting and receiving apparatus and an altimeter switch effective to distinctively receive controls transmitted from the nearest block station for the particular flight altitude of the airplane and to transmit indications to the nearest block station as to the particular controls that are received, a plurality of signal aspect control relays, electro-responsive means including said relays distinctively conditioned in response to respective signal controls received by said radio receiving apparatus on the airplane, a multiple aspect signal having its aspects selected by said control relays, and a check relay conditioned in response to a control transmitted from the nearest block station that is indicative of the control indicated at that block station as being received on the airplane in correspondence with the signal aspect control that is transmitted from the block station for that airplane, said check relay being effective when energized to render said electro-responsive means non-responsive to controls subsequently received by said radio receiving apparatus on the airplane.

7. In a block signalling system for governing the respective aspects of a multiple aspect signal on an airplane from the nearest ground located block station, signal control means for governing the display of the respective aspects of said signal comprising, two-way radio pulse communciation apparatus for communicating between the block station and the airplane, a signal control relay, a check relay, and electro-responsive means on the airplane including said signal control relay and said check relay selectively energized in response to respective distinctive signal controls received from the ground station, said electro-responsive means when rendered active being effective to cause said signal to display a selected aspect, and said electro-responsive means when rendered active being effective to prevent a change in the signal aspect displayed until said electro-responsive means is first rendered inactive by discontinuing the transmission of prior initiated controls from the block station.

References Cited in the file of this patent

UNITED STATES PATENTS

| Number | Name | Date |
|---|---|---|
| 1,763,390 | Davis | June 10, 1930 |
| 1,894,019 | Buckley | Jan. 10, 1933 |
| 2,252,083 | Luck | Aug. 12, 1941 |
| 2,403,755 | Rankin | July 9, 1946 |
| 2,421,017 | Deloraine | May 27, 1947 |
| 2,459,811 | Grieg | Jan. 25, 1949 |
| 2,483,097 | McIlwain | Sept. 27, 1949 |
| 2,517,540 | Busignies | Aug. 8, 1950 |
| 2,521,697 | Deloraine et al. | Sept. 12, 1950 |
| 2,531,412 | Deloraine | Nov. 28, 1950 |
| 2,554,329 | Hammond | May 22, 1951 |
| 2,588,930 | Kendall et al. | Mar. 11, 1952 |